United States Patent [19]

Watanabe et al.

[11] Patent Number: 5,292,834
[45] Date of Patent: Mar. 8, 1994

[54] METHOD OF PREVENTING POLYMER SCALE DEPOSITION

[75] Inventors: Mikio Watanabe; Masahiro Usuki, both of Kamisu; Susumu Ueno, Hazaki, all of Japan

[73] Assignee: Shin-Etsu Chemical Co., Ltd., Tokyo, Japan

[21] Appl. No.: 727,901

[22] Filed: Jul. 10, 1991

[30] Foreign Application Priority Data

Jul. 11, 1990 [JP] Japan ................................. 2-183073

[51] Int. Cl.$^5$ .............................................. C08F 2/00
[52] U.S. Cl. ..................................... 526/62; 422/131
[58] Field of Search ........................... 526/62; 422/131

[56] References Cited

U.S. PATENT DOCUMENTS 4,098,972  7/1978  Ogawa et al. .......................... 526/62
4,180,634 12/1979  Koyanagi et al. ..................... 526/74

FOREIGN PATENT DOCUMENTS 0320227 6/1989 European Pat. Off. .
0355575 2/1990 European Pat. Off. .
0372996 6/1990 European Pat. Off. .
372996  6/1990 European Pat. Off. .

*Primary Examiner*—Joseph L. Schofer
*Assistant Examiner*—Tom Weber
*Attorney, Agent, or Firm*—Oblon, Spivak, McClelland, Maier & Neustadt

[57] ABSTRACT

A method of preventing polymer scale deposition in a polymerization vessel in polymerization of a particular monomer having an ethylenic double bond having a high dissolving power against the conventional scale preventive coatings, wherein said polymerization is carried out in a polymerization vessel of which the inner wall has been previously coated with a first coating liquid comprising:

(A) a water-soluble anionic dye, and
(B) a metal salt, to form a first coating, and the first coating thus formed has been then coated with a second coating liquid comprising:
(C) an alkaline earth metal compound, and at least one member selected from the group consisting of:
(D) a water-soluble anionic dye and
(E) an inorganic colloid, to form a second coating. Polymer scale deposition can be effectively prevented.

23 Claims, No Drawings

METHOD OF PREVENTING POLYMER SCALE DEPOSITION

BACKGROUND OF THE INVENTION

1. Field of the Invention

The present invention relates to a method of preventing polymer scale deposition in a polymerization vessel during polymerization of a monomer having an ethylenic double bond.

2. Description of Prior Art

In processes of preparing polymers by polymerizing a monomer in a polymerization vessel, the problem that polymers deposit on the inner wall surface and other parts which come into contact with the monomer such as stirring blades of the polymerization vessel in the form of scale, is known. The deposition of the polymer scale on the inner wall results in disadvantages that the yield of the polymer and the cooling capacity of the polymerization vessel are lowered; that the polymer scale may peel and mix into manufactured polymer, thereby impairing the quality of the manufactured polymer; and that removal of such polymer scale is laborious and hence time-consuming. Further, since the polymer scale contains unreacted monomer, there is a danger that the operators may be exposed to the unreacted monomer, which may cause some physical disorders.

Heretofore, there are known methods for preventing polymer scale deposition in which the inner wall and so forth are coated with a suitable substance as a polymer scale preventive agent. Such substances suited as polymer preventive agents include, for example, particular polar compounds (Japanese Patent Publication (KOKOKU) No. 45-30343(1970)); dyes or pigments (Japanese Patent Publication (KOKOKU) No. 45-30835(1970)); aromatic amine compound (Japanese Pre-examination Patent Publication (KOKAI) No. 51-50887(1976)); a reaction product of a phenolic compound with an aromatic aldehyde (Japanese Pre-examination Patent Publication (KOKAI) No. 55-54317(1980)).

These methods are effective in preventing polymer scale deposition, in the case where the monomer to be polymerized is a vinyl halide such as vinyl chloride or a monomer mixture containing largely a vinyl halide. However, in the case where the monomer having an ethylenic double bond to be polymerized is a monomer having the general formula:

$$CH_2=CXY$$

wherein X is a hydrogen atom or the methyl group; Y is a hydrogen atom, an alkyl group or a group represented by the formula: —COOH, —COOM where M is an alkali metal or an ammonium ion, —COOR, —OCOR, —OR (where in the formulas R is an alkyl group), —CN, —C$_6$H$_5$, —C$_6$H$_4$Z (where Z is an hydrogen atom, —OH, —CH$_3$ or —CH=CH$_2$), or —CH=CH$_2$, including styrene, α-methylstyrene, acrylates and acrylonitrile, which have as high dissolving power against the coatings formed by the above prior art methods, the coatings may be partly or completely dissolved away. Consequently, it becomes impossible to prevent the deposition of polymer scale effectively. Particularly, among the monomers, styrene, α-methylstyrene, acrylates and acrylonitrile have extremely strong dissolving power; therefore effects of preventing polymer scale can not be attained as desired. Besides, particularly where a polymerization vessel made of stainless steel is used, polymer scale is liable to deposit on the inner wall surfaces of the polymerization vessel.

SUMMARY OF THE INVENTION

Accordingly, it is an object of the present invention to provide a method capable of effectively preventing polymer scale deposition on the inner wall of a polymerization vessel in the polymerization or copolymerization of a particular monomer having an ethylenic double bond mentioned above, independent of the materials constituting the inner wall of the polymerization.

The present inventors have discovered that a specific double coating composed of an undercoat and a overcoat can prevent the deposition polymer scale on the inner wall, etc.

Thus, the present invention provides, as a means of solving the prior art problems, a method of preventing polymer scale deposition in a polymerization vessel in polymerization of a monomer having an ethylenic double bond having the general formula (I):

$$CH_2=CXY \qquad (I)$$

wherein X is a hydrogen atom or the methyl group; Y is a hydrogen atom, an alkyl group (normally, an alkyl group having 1 to 4 carbon atoms such as methyl, ethyl, propyl and butyl) or a group represented by the formula: —COOH, —COOM (where M is an alkali metal such as K, Na or Li or an ammonium ion), —COOR, —OCOR, —OR (where in the formulas R is an alkyl group, normally, an alkyl group having 1 to 4 carbon atoms), —CN, —C$_6$H$_5$, —C$_6$H$_4$Z (where Z is an hydrogen atom, —OH, —CH$_3$ or —CH=CH$_2$), or —CH=CH$_2$, wherein said polymerization is carried out in a polymerization vessel of which the inner wall has been previously coated with a first coating liquid comprising:

(A) a water-soluble anionic dye and
(B) a metal salt, to form a first coating, and the first coating thus formed has been then coated with a second coating liquid comprising:
(C) an alkaline earth metal compound, and at least one member selected from the group consisting of:
(D) a water-soluble anionic dye and
(E) an inorganic colloid
to form a second coating.

The present invention also provide a polymerization vessel having the double coating formed as set out above on the inner wall.

According to the present invention, polymer scale deposition can be effectively prevented in the polymerization or copolymerization or of monomers having an ethylenic double bond represented by said general formula (I) in which effective prevention of polymer scale deposition has been so far difficult due to the high dissolving power of the monomer against the conventional scale preventive coatings. Particularly, even in polymerizing monomers having extremely high dissolving power such as styrene, α-styrene, acrylates and acrylonitrile, polymer scale deposition can be prevented.

The coating formed on the inner wall surfaces, etc. of the polymerization vessel retains its scale preventing action; hence polymerization runs can be repeated without operations of removing polymer scale, and polymers of good quality can be produced as well.

Moreover, even in the polymerization in a stainless steel polymerization vessel, in which polymer deposition has been liable to occur so far, polymer deposition can be effectively prevented.

DETAILED DESCRIPTION OF PREFERRED EMBODIMENTS

The present invention will now be described below in detail.

First Coating

The first coating is formed by using the first coating liquid comprising (A) a water-soluble anionic dye and (B) a metal salt.

(A) Water-soluble Dye

The water-soluble anionic dye used as component (A) of the first coating liquid includes, for example, those having a solfonic acid group, a carboxylic acid group, or both of them.

Specifically, examples of the dye include C.I. Acid Yellow 38; C.I. Acid Red 18, 52, 73, 80 and 87; C.I. Acid Violet 11 and 78; C.I. Acid Blue 1, 40, 59, 113, 116, 120 and 158; C.I. Acid Orange 3 and 7; C.I. Acid Black 1, 2 and 124; C.I. Direct Orange 2, 10, 26 and 97; C.I. Direct Red 1, 31, 92 and 186; C.I. Direct Violet 1 and 22; C.I. Direct Blue 1, 6, 71, 86 and 106; C.I. Direct Black 2, 19, 32, 38 and 77; C.I. Direct Green 1 and 26; C.I. Direct Yellow 1; C.I. Direct Brown 1, 37 and 101; C.I. Food Yellow 3; C.I. Reactive Yellow 3; C.I. Reactive Blue 2, 4 and 18; C.I. Mordand Violet 5; C.I. Mordand Black 5; C.I. Mordant Yellow 26; C.I. Fluorescent Brightening Agent 30 and 32; C.I. Solubilized Vat Black 1; and C.I. Azoic Brown 2. These water-soluble dyes can be used singly or in combination of two or more.

Among the water-soluble anionic dyes, particularly preferred are C.I. Acid Blue 1, 40 and 59; C.I. Acid Black 1, 2 and 124; C.I. Direct Blue 1, 6, 71, 86 and 106; C.I. Direct Black 2, 19, 32, 38 and 77; C.I. Direct Brown 1 and 37; C.I. Reactive Blue 2, 4 and 18; C.I Mordant Black 5; C.I. Solubilized Vat Black 1; and C.I. Azoic Brown 2.

(B) Metal Salt

The metal salt used as component (B) of the first coating liquid in the present invention includes, for example, silicates, carbonates, phosphates, sulfates, nitrates, borates, acetates and halides of metals, e.g., alkaline metals such as lithium, sodium and potassium; alkaline earth metals such as magnesium, calcium and barium; zinc family metals such as zinc; aluminum family metals such as aluminum; tin family metals such as titanium and tin; iron family metals such as iron and nickel; chromium family metals such as chromium and molybdenum; manganese family metals such as manganese; copper family metals such as copper; and silver, platinum family metals such as platinum. These metal compounds may be used singly or in combination of two or more.

Among the metal salts, preferred are silicates of sodium, potassium and lithium, phosphates of sodium and potassium, sodium pyrophorsphate, sulfates of magnesium, calcium, barium, aluminum, titanium, molybdenum, manganese and copper, nitrates of magnesium, calcium, barium, zinc, aluminum and titanium, borates of magnesium, calcium, barium, and titanium, acetates of magnesium, calcium, barium, zinc aluminum, titanium, tin, iron, nickel and copper, and chlorides of aluminum, titanium, iron, nickel and copper.

Preparation of the First Coating Liquid

The first coating liquid can be prepared by dissolving or dispersing at least one of component (A) and at least one of component (B) in a suitable solvent. The ratio of component (A)/component (B) by weight preferably ranges from 100/0.1 to 100/500, more preferably from 100/1 to 100/100. If component (B) is too small relative to component (A), the polymer scale preventing effect due to the use of component (B) in combination may not be obtained. If the amount of component (B) is too large relative to component (A), component (A) may agglomerate, and thereby it may be impossible to form uniform coatings. The total concentration of components (A) and (B) in the first coating liquid is not limited as long as a desired coating weight described later is achieved, but normally it preferably ranges from about 0.005 to about 10% by weight, preferably 0.01 to 5% by weight.

The solvent used for preparation of the first coating liquid include, for example, water; alcohols such as methanol, ethanol, propanol, 1-butanol, 2-butanol, 2-methyl-1-propanol, 2-methyl-2-propanol, 3-methyl-1-butanol, and 2-methyl-2-butanol, 2-pentanol; aliphatic hydrocarbons such as n-hexane, n-heptane and the like; aromatic hydrocarbons such as benzene, toluene, and xylene; halogenated hydrocarbons such as chloromethylene, 1-chlorobutane, chloropentane, dichloroethylene, and 1,1,2-trichloroethane; ketones such as acetone and methyl ethyl ketone; esters such as methyl formate, ethyl acetate, methyl acetate and diethylene glycol monomethyl ether acetate; ethers such as ethyl ether, 1,4-dioxane and ethylene glycol monomethyl ether; and aprotic solvents such as dimethylformamide, dimethyl sulfoxide, and acetonitrile. These solvents can be used singly or as a mixed solvent of two or more.

Among there solvents, particularly preferred are water, methanol, ethanol, acetone and mixed solvents of two or more of these.

The pH of the first coating liquid may be adjusted to proper range as necessary. Generally, as the water-soluble anionic dye is used as component (A), the pH is preferably adjusted to 7 or below, preferably 5 or below, by addition of a pH adjuster.

The pH adjusters which may be used when the pH of the first coating liquid include, for example, sulfuric acid, hydrochloric acid, phosphoric acid, nitric acid, carbonic acid, perchloric acid, molybdic acid, tungstic acid, phosphomolybdic acid, phosphotungstic acid, molybdosilicic acid, tungstosilicic acid, formic acid, acetic acid, oxalic acid, lactic acid, maleic acid, glycollic acid, thioglycollic acid, p-toluenesulfonic acid, phytic acid and the acid salts thereof. Among these, particularly preferred are hydrochloric acid, phosphoric acid, perchloric acid, molybdic acid, tungstic acid, phosphomolybdic acid, phosphotungstic acid, molybdosilicic acid, tungstosilicic acid, p-toluenesulfonic acid, phytic acid and the acid salts thereof. These pH adjusters are preferably used as an aqueous solution with a suitable concentration when the pH of the first coating liquid is adjusted.

Formation of the First Coating

The first coating liquid is applied to the inner walls of a polymerization vessel and then dried sufficiently, followed by washing with water if necessary, to form the first coating. The drying may be carried out at a temperature from room temperature to 100° C., for instance.

The first coating liquid is preferably applied to not only the inner wall surface of a polymerization vessel but also other parts with which the monomer comes into contact during polymerization to form the coating on such parts. For example, it is preferred to apply the coating liquid to a stirring shaft, stirring blades, condensers, headers, search coil, bolts, nuts, etc. to form the coating thereon. Particularly, on stirring blades, stirring shaft and baffles, the coating should be formed by application of the coating liquid.

More preferably, for formation of the coating, the first coating liquid is applied to parts on which polymer scale may deposit, for example, parts of recovery system for unreacted monomer with which unreacted monomer comes into contact, such as inner surfaces, etc. of equipment and pipes of the recovery system. Specifically, such parts include the inner surfaces of monomer distillation columns, condensers, monomer stock tanks and valves.

The method of applying the first coating liquid is not particularly limited, and includes, for example, the brush coating, spray coating, the method of filing the polymerization vessel with the coating liquid followed by withdrawal thereof, and automatic coating methods as disclosed in Japanese Pre-examination Patent Publication (KOKAI) Nos. 57-61001(1982) and 55-36288(1980), and Japanese Pre-examination Patent Publication (KOHYO) Nos. 56-501116(1981) and 56-501117(1981), and Japanese Pre-examination Publication (KOKAI) No. 59-11303(1984), etc.

The method of drying wet coated surfaces provided by application of the first coating liquid, is not limited, either. Following methods can be used. That is, a method in which, after the solution is applied, hot air with a suitable elevated temperature is blown to the coated surface, and a method in which the inner wall surface of a polymerization vessel and the surfaces of other parts to be coated are previously heated to from 30° to 80° C., and the first coating liquid is directly applied to the heated inner wall surfaces, etc. After dried, the coated surfaces are washed with water if necessary.

The first coating thus obtained normally has a coating weight of preferably from 0.001 to 5 g/m$^2$, and more preferably from 0.01 to 1 g/m$^2$ in the dry state.

Second Coating

The second coating is prepared on the first coating by using the second coating liquid comprising the (C) component, an alkaline earth metal compound, and at least one member selected from the group consisting of component (D), a water-soluble anionic dye, and component (E), an inorganic colloid.

(C) Alkaline Earth Metal Compound

The alkaline earth metal compound used an component (C) of the second coating liquid includes, for example, silicates, carbonates, phosphates, sulfates, nitrates, borates, acetates, hydroxides, oxides, halides, etc. of alkaline metals such as magnesium, calcium and barium. These alkaline earth metal compounds may be used singly or in combination of two or more.

Among the alkaline earth metal compounds, particularly preferred are magnesium carbonate, calcium carbonate, magnesium phosphate, calcium phosphate, barium phosphate, calcium sulfate, calcium borate, magnesium hydroxide, calcium hydroxide, barium hydroxide, magnesium chloride, and calcium chloride.

(D) Water-soluble Anionic Dye

The water-soluble anionic dye used as component (D) of the second coating liquid includes, for example, those exemplified as component (A) of the first coating liquid. The water-soluble anionic dyes can be used singly or in combination of two or more. The dyes described as preferred component (A) are also preferred as component (D).

(E) Inorganic Colloid

The inorganic colloid which may be used as component (E) includes, for example, gold colloid, silver colloid, sulfur colloid, colloid of ferric hydroxide, colloid of stannic acid, colloid of silicic acid, colloid of manganese dioxide, colloid of molybdenum oxide, colloid of vanadium pentoxide, colloid of aluminum hydroxide, and colloid of lithium silicate. These inorganic colloids can be prepared by mechanical crushing, irradiation with ultrasonic wave, electrical dispersion or chemical methods.

These inorganic colloids can be used singly or in combination of two or more.

Among the inorganic colloids, particularly preferred are gold colloid, silicic acid colloid, aluminum hydroxide colloid and lithium silicate colloid.

Preparation of the Second Coating Liquid

The second coating liquid can be prepared by dissolving or dispersing at least one alkaline earth metal compound (C) and at least one compound selected from the water-soluble anionic dyes (D) and the inorganic colloids (E) in a suitable solvent. Component (D) and component (E) are preferably used in combination, thereby further improving the scale preventing effect.

The weight ratio of component (C)/[components (D) and (E)] is preferably in the range of 100/1 to 100/5,000, more preferably 100/10 to 100/1,000. If the amount of components (D) and (E) is too small or too large relative to that of component (C), the scale preventing effect due to the combined use of component (C) and components (D) and/or (E) cannot be obtained.

Where component (D) and component (E) are used in combination, the weight ratio of component (D)/component (E) is preferably in a range of 100/1 to 100/10,000, more preferably 100/10 to 100/1,000. If the weight ratio is outside the above range, it is difficult to obtain the effect due to the combined use of the components (D) and (E).

The total concentration of component (C) and the component(s) (D) and /or (E) is not particularly limited, as long as a desired coating weight described later is obtained. It may be normally from about 0.005 to 10% by weight, preferably from about 0.01 to 5% by weight.

The solvent used for preparation of the second coating liquid includes, for example, water and organic solvents which can be readily mixed with water, including for example, among the solvents exemplified for preparation of the first coating liquid, alcohol solvents, ester solvents, and ketone solvents. These solvents may be used singly or as a mixed solvent of two or more.

Among the solvents, particularly preferred are pure water and mixed solvents such as water/methanol, water/ethanol, water/n-prpanol, water/n-butanol, water/isobutyl alcohol, water/sec-butyl alcohol, and water/acetone.

In preparation of the second coating liquid, the pH thereof is preferably controlled to 6 or less, more preferably 5 or less so that the alkaline metal earth metal compound (C) may be sufficiently dissolved and uniform and strong coatings may be obtained after application of the second coating liquid.

The pH adjusters which may be used to control the pH of the second coating liquid include, for example, those exemplified for the first coating liquid. The pH adjusters described as preferred ones for the first coating liquid are also preferable for the second coating liquid. The pH adjuster is preferably used as an aqueous solution having a suitable concentration when used for preparation of the second coating liquid.

Formation of the Second Coating

The second coating liquid is applied onto the first coating formed on the inner wall surfaces, etc., and then dried sufficiently, followed by washing with water if necessary, to form the second coating. The drying may be carried out at a temperature from room temperature to 100° C., for instance.

The method of applying the second coating liquid is not particularly limited. The application can be conducted by the methods exemplified for the first coating liquid, that is, brush coating, spray coating, the method of filing the polymerization vessel with the coating liquid followed by withdrawal thereof, and automatic coating methods.

The method of drying the second coating liquid applied on the first coating is not particularly limited, either. Those exemplified for drying the first coating liquid can be used, for instance.

The second coating thus obtained normally has a coating weight of preferably from 0.001 to 5 g/m$^2$, and more preferably from 0.01 to 1 g/m$^2$ in the dry state.

Polymerization

After the formation of the first and second coatings on the inner wall surface of a polymerization vessel, other parts with which monomer may come into contact, etc. by coating operation, polymerization is carried out in accordance with conventional procedures. That is, a monomer having an ethylenic double bond of the general formula (I), a polymerization initiator (catalyst), and optionally a polymerization medium such as water, etc., a suspending agent, a solid dispersing agent, a dispersing agent such as nonionic or anionic surfactants are charged into the polymerization vessel, followed by carrying out polymerization according to conventional methods.

The monomer having an ethylenic double bond of the general formula (I) to which the method of this invention can be applied may include, for example, vinyl esters such as vinyl acetate and vinyl propionate; acrylic acid, methacrylic acid, and esters and salts thereof; and diene monomers such as butadiene, chloroprene and isoprene; as well as styrene, α-methyl styrene, acrylonitrile and vinyl ethers.

There are no particular limitations on the type of polymerization to which the method of this invention can be applied. The present invention is effective in any forms of polymerization such as suspension polymerization, emulsion polymerization, solution polymerization, bulk polymerization, and gas phase polymerization.

In the following, general conditions are described on each form of polymerization.

In the case of suspension or emulsion polymerization, first, water and a dispersing agent are charged into a polymerization vessel, and thereafter a polymerization initiator and monomers are charged. Subsequently, the inside of the polymerization vessel is evacuated to a pressure of from 0.1 to 760 mmHg, and a monomer is then charged (whereupon the pressure inside the polymerization vessel usually becomes from 0.5 to 30 kgf/cm$^2$·G). Thereafter, polymerization is carried out at a temperature of from 30° to 150° C. During the polymerization, one or more of water, a dispersing agent and a polymerization initiator may be added, if necessary. Reaction temperature during the polymerization is different depending on the kind of monomer to be polymerized. For example, in the case of polymerizing vinyl chloride, polymerization is carried out at 30° to 80° C.; in the case of polymerizing styrene, polymerization is carried out at 50° to 150° C. The polymerization may be judged to be completed when the pressure inside the polymerization vessel falls to from 0 to 7 kgf/cm$^2$·G or when cooling water which passes through a jacket provided around the polymerization vessel indicates almost the same temperature at the inlet where it is charged and at the outlet where it is discharged (i.e., when liberation of heat come to be completed). The water, dispersing agent and polymerization initiator to be charged for polymerization are used in amounts of 20 to 500 parts by weight, 0.01 to 30 parts by weight, and 0.01 to 5 parts by weight, respectively, per 100 parts by weight of the monomer.

In the case of solution polymerization, an organic solvent such as toluene, xylene and pyridine is used as the polymerization medium in place of water. The dispersing agent is optionally used. The other conditions are generally the same as those described for suspension and emulsion polymerizations.

In the case of bulk polymerization, after the inside of a polymerization vessel is evacuated to a pressure of from about 0.01 mmHg to about 760 mmHg, a monomer and a polymerization initiator are charged into the polymerization vessel, and then polymerization is carried out at a temperature of from −10° C. to 250° C. Specific methods of the bulk polymerization includes, for example, liquid bulk polymerization and gas phase polymerization for vinyl chloride.

Application of the method of preventing polymer scale deposition of the present invention to polymerization, makes it possible to prevent polymer scale from depositing, independent of materials constituting the inner wall, etc. of a polymerization vessel. For example, this method can prevent deposition of polymer scale even in the case polymerization is carried out in a polymerization vessel made of a steel including stainless steel or lined with glass.

Any additive materials that have been conventionally added in a polymerization system can be used without any limitation. More specifically, the method of this invention can effectively prevent polymers from depositing, even in polymerization systems containing the following additives: for example, polymerization catalysts such as t-butyl peroxyneodecanoate, bis(2-ethylhexyl) peroxydicarbonate, 3,5,5-trimethylhexanoyl peroxide, α-cumyl peroxyneodecanoate, cumene hydroperoxide, cyclohexanone peroxide, t-butyl peroxypivalate, bis(2-ethylhexyl) peroxydicarbonate, benzoyl peroxide, lauroyl peroxide, 2,4-dichlorobenzoyl peroxide, diisopropyl peroxydicarbonate, α,α'-azobisisobutyronitrile, α,α'-azobis-2,4-dimethylvaleronitrile, potassium peroxodisulfate, ammonium peroxodisulfate, and p-menthane hydroperoxide; suspension agents comprised of natural or synthetic polymeric compounds such as partially saponified polyvinyl alcohols, polyacrylic acids, vinyl acetate/maleic anhydride copolymer, cellulose derivatives such as hydroxypropylmethyl cellulose, and gelatin; solid dispersing agents such as calcium phosphate and hydroxyapatite; nonionic emulsifying agents such as sorbitan monolaurate, sorbitan trioleate and polyoxyethylene alkyl ether; anionic emulsifying agents such as sodium lauryl sulfate, sodium alkylbenzenesulfonates such as sodium dodecylbenzenesulfonate and sodium dioctylsulfosuccinate; fillers such as calcium carbonate and titanium oxide; stabilizers such as tribasic lead sulfate, calcium stearate, dibutyltin dilaurate and dioctyltin mercaptide; lubricants such as rice wax, stearic acid and cetyl alcohol; plasticizers such as DOP and DBP; chain transfer agents such as mercaptans such as t-dodecyl mercaptan, and trichloroethylene; and pH adjusters.

Polymerizations for which the method of the present invention is particularly preferably applied, include, for example, the copolymerization of acrylonitrile and styrene or the homopolymerization of styrene by suspension polymerization using a solid dispersing agent, polymerization for production of beads or latexes of polymers such as polystyrene, polymethyl methacrylate and polyacrylonitrile in a polymerization vessel made of stainless steel, emulsion polymerizations for production of SBR, NBR, CR, IR, IIR or the like, and polymerization for production of ABS resin.

In the practice of the present method, the coating operation of the coating liquids may be conducted suitably every batch or every some tens of batches. The coating formed has a high durability and maintain the polymer scale preventing action. Therefore, normally, coating treatment may be conducted every several batches or some tens of batches, so that the polymerization vessel can be used repeatedly without deposition of polymer scale on the inner wall, etc. of the vessel.

EXAMPLES

The present invention is now described in detail by way of working examples and comparative examples. In each of the tables below, Experiment Nos. marked with * indicate comparative examples, and the other Experiment Nos., working examples of the present invention.

PREPARATION EXAMPLE OF FIRST COATING LIQUIDS

Component (A) (water-soluble anionic dye) and component (B)(metal salt) were dissolved or dispersed in a solvent, followed by adjustment of pH to 2.5 with sulfuric acid, to prepare coating liquid Nos. 1 to 16.

About each of coating liquids, the kinds of component (A) and component (B), the total concentration of (A)+(B) and the weight ratio of (A)/(B) in the coating liquid, and the solvent used are given in Table 1.

TABLE 1

| Coating solution No. | (A) Water-soluble anionic dye | (B) Metal salt | Total concentration (wt. %) | Weight ratio (A)/(B) | Solvent |
|---|---|---|---|---|---|
| 1 | C.I. Acid Black 2 | Titanium sulfate | 1.0 | 100/10 | Water |
| 2 | C.I. Acid Black 2 | Titanium sulfate | 0.5 | 100/10 | Water |
| 3 | C.I. Acid Black 2 | Titanium sulfate | 0.1 | 100/10 | Water |
| 4 | C.I. Acid Black 2 | Titanium sulfate | 0.01 | 100/10 | Water |
| 5 | C.I. Acid Black 2 | Copper sulfate | 0.5 | 100/30 | Water |
| 6 | C.I. Acid Black 2 | Sodium Silicate | 0.5 | 100/100 | Water/Methanol (60/40) |
| 7 | C.I. Acid Black 2 | Zinc acetate | 0.5 | 100/50 | Methanol |
| 8 | C.I. Acid Violet 78 | Ferric chloride | 0.5 | 100/5 | Methanol |
| 9 | c.I. Direct Orange 2 | Nickel chloride | 0.5 | 100/10 | Methanol |
| 10 | C.I. Direct Blue 86 | Calcium chloride | 0.5 | 100/100 | Water |
| 11 | C.I. Direct Black 2 | Titanium acetate | 0.5 | 100/20 | Water |
| 12 | C.I. Direct Black 19 | Ferric chloride | 0.5 | 100/10 | Water |
| 13 | C.I. Direct Black 32 | Copper acetate | 0.5 | 100/40 | Water/Ethanol (30/70) |
| 14 | C.I. Direct Black 38 | Alminum nitrate | 0.5 | 100/50 | Water/Methanol (50/50) |
| 15 | C.I. Direct Black 77 | Nickel acetate | 0.5 | 100/5 | Water/t-Butanol (50/50) |
| 16 | C.I. Reactive Blue 4 | Titanium nitrate | 0.5 | 100/1 | Water |

PREPARATION OF PREPOLYMER

A prepolymer to be used in Example 1 was prepared by the following manner.

In a polymerization vessel, 6,000 g of styrene, 720 g of a polybutadiene rubber, 480 g of a mineral oil (tradename: CP-50, product of IDEMITSU KOSAN CO., LTD.) and 6,000 g of n-dodecylmercaptan were charged, and they were then reacted at 115° C. for 5 hours to thereby produce a prepolymer.

EXAMPLE 1

In each experiment, polymerization was carried out in the following manner using a stainless steel polymerization vessel with an inner capacity of 20 liters and equipped with a stirrer.

In Experiment Nos. 102 and 104–125, as the first coating liquid, one of coating liquid Nos. 1 to 16 was applied to the inner wall surfaces, stirring shaft, stirring blades, baffles and other parts with which monomers come into contact during polymerization, and then dried at 50° C. for 15 minutes by heating to form a first coating.

Next, component (C) (alkaline earth metal compound), component (D) (water-soluble anionic dye) and component (E) (inorganic colloid) were dissolved or dispersed in water so as to give a total concentration of 0.5% by weight, and pH was controlled with a pH adjuster as necessary, to prepare a second coating liquid. The second coating liquid thus prepared was applied onto the first coating above, and then dried at 50° C. for 15 minutes, followed by washing with water, to form a second coating. However, Experiment Nos. 101 to 103 are comparative examples, in which no coating liquid was applied or either the first coating liquid or the second coating liquid only was applied.

The No. of the first coating liquid used in each experiment, and the kinds of components (C), (D) and (E) and the pH adjuster used for the second coating liquid in each experiment, the weight ratio of the components (C), (D) and (E) and pH of the second coating liquid are given in Table 1.

called scale prevented runs) was measured. Results are given in Table 2.

TABLE 2

| Exp. No. | First coating solution Coating solution No. | Second coating solution | | | | | | No. of scale prevented runs |
|---|---|---|---|---|---|---|---|---|
| | | (C) Alkali earth metal compound | (D) Water-soluble anionic dye | (E) Inorganic colloid | Weight ratio (C)/(D)/(E) | pH adjuster | pH | |
| 101* | None | None | None | None | — | None | — | 0 |
| 102* | 2 | None | None | None | — | None | — | 0 |
| 103* | None | Calcium phosphate | C.I. Acid Black 2 | Silicic acid colloid | 100/100/200 | Perchloric acid | 3.0 | 0 |
| 104 | 2 | Calcium phosphate | C.I. Acid Black 2 | Silicic acid colloid | 100/100/200 | Perchloric acid | 3.0 | 30 |
| 105 | 2 | Calcium phosphate | None | Silicic acid colloid | 100/0/200 | Perchloric acid | 3.0 | 10 |
| 106 | 2 | Calcium phosphate | C.I. Acid Black 2 | None | 100/100/0 | Perchloric acid | 3.0 | 5 |
| 107 | 2 | Calcium carbonate | C.I. Acid Black 1 | Lithium silicate colloid | 100/100/200 | Perchloric acid | 3.0 | 38 |
| 108 | 2 | Calcium carbonate | C.I. Acid Black 1 | Lithium silicate colloid | 100/100/200 | None | 6.5 | 17 |
| 109 | 1 | Calcium carbonate | C.I. Acid Black 1 | Lithium silicate colloid | 100/100/200 | Hydrochloric acid | 3.0 | 38 |
| 110 | 3 | Calcium carbonate | C.I. Acid Black 1 | Lithium silicate colloid | 100/100/200 | Hydrochloric acid | 2.0 | 20 |
| 111 | 4 | Calcium carbonate | C.I. Acid Black 1 | Lithium silicate colloid | 100/100/200 | Hydrochloric acid | 1.0 | 13 |
| 112 | 5 | Calcium hydroxide | C.I. Direct Blue 86 | Lithium silicate colloid | 100/100/200 | Hydrochloric acid | 1.0 | 30 |
| 113 | 5 | Calcium borate | C.I. Acid Red 18 | Lithium silicate colloid | 100/50/300 | Molybdic acid | 4.0 | 33 |
| 114 | 5 | Calcium chloride | C.I. Acid Black 2 | Lithium silicate colloid | 100/50/300 | Molybdic acid | 4.0 | 35 |
| 115 | 6 | Magnesium phosphate | C.I. Direct Red 31 | Lithium silicate colloid | 100/250/250 | Phosphoric acid | 2.5 | 31 |
| 116 | 7 | Barium hydroxide | C.I. Food Yellow 3 | Lithium silicate colloid | 100/250/500 | Phosphoric acid | 2.5 | 30 |
| 117 | 8 | Magnesium hydroxide | C.I. Direct Blue 6 | Gold colloid | 100/50/100 | Phytic acid | 3.0 | 34 |
| 118 | 9 | Calcium borate | C.I. Reactive Blue 4 | Silicic acid colloid | 100/50/100 | Phytic acid | 2.5 | 25 |
| 119 | 10 | Magnesium sulfate | C.I. Acid Red 52 | Molybdenum oxide colloid | 100/200/300 | Sulfuric acid | 5.0 | 24 |
| 120 | 11 | Calcium carbonate | C.I. Direct Green 26 | Aluminum hydroxide colloid | 100/200/300 | Sulfuric acid | 3.0 | 25 |
| 121 | 12 | Barium phosphate | C.I. Acid Black 124 | Manganese dioxide colloid | 100/200/300 | Sulfuric acid | 1.0 | 28 |
| 122 | 13 | Calcium hydroxide | C.I. Reactive Blue 2 | Silver colloid | 100/10/100 | Perchloric acid | 2.5 | 27 |
| 123 | 14 | Calcium chloride | C.I. Direct Brown 1 | Ferrous hydroxide colloid | 100/30/50 | Perchloric acid | 0.5 | 30 |
| 124 | 15 | Calcium nitrate | C.I. Acid Red 73 | Silicic acid colloid | 100/30/500 | Perchloric acid | 0.5 | 21 |
| 125 | 16 | Calcium acetate | C.I. Acid Black 2 | Silicic acid colloid | 100/100/500 | Phosphoric acid | 2.5 | 38 |

Subsequently, in the polymerization vessel thus coated, were charged 7,000 g of water, 7,000 g of the prepolymer obtained in the above, 70 g of hydroxyapatite, 0.14 g of sodium dodecylbenzenesulfonate, 17.5 g of benzoyl peroxide and 10.5 g of t-butyl perbenzoate. Then, reaction was carried out at 92° C. for 3.5 hours, and reaction was continued at 135° C. for another 1 hour. After the completion of the polymerization, the resulting polymer was taken out of the polymerization vessel, and then the amount of polymer scale depositing on the inner wall of the polymerization vessel was measured. Thereafter, the inside of the vessel was washed with water.

The operations from forming the coating by application of the first and second coating liquids, through charging the monomer, etc. and polymerization to washing with water were repeated, and number of polymerization runs which could be repeated before the amount of polymer scale exceeded 1 g/m² (hereinafter

EXAMPLE 2

In each experiment, a coating was formed by application of a first coating liquid and a second coating liquid in a stainless steel polymerization vessel with an inner capacity of 300 litters and equipped with a stirrer, in the same manner as in Example 1. However, Experiment Nos. 201 to 203 are comparative examples in which no coating liquid was applied or either the first coating liquid or the second coating liquid only was applied.

The No. of the first coating liquid used in each experiment, and the kinds of components (C), (D) and (E) and the pH adjuster used in the second coating liquid in each experiment, the weight ratio of the components (C), (D) and (E) and pH of the second coating liquid are given in Table 3.

Subsequently, in the polymerization vessel thus coated, were charged 60 kg of styrene, 40 kg of acrylonitrile, 100 kg of water, 2 kg of hydroxyapatite, 40 g of sodium lauryl sulfate, 300 g of t-dodecylmercaptan and 400 g of lauroyl peroxide. The mixture was stirred at 70° C. for 1 hour, and then was heated from 70° C. to 80° C. over 2 hours. Then, reaction was allowed to proceed at 80° C. for 1 hour to produce a polymer. After the completion of the polymerization, the resulting polymer was taken out of the polymerization vessel, and then the amount of polymer scale depositing on the inner wall of the polymerization vessel was measured. Thereafter, the inside of the vessel was washed with water.

The operations from forming the coating by application of the first and second coating liquids, through charging the monomer, etc. and polymerization to washing with water were repeated, and number of scale prevented runs which could be repeated before the amount of polymer scale exceeded 1 g/m² was measured. Results are given in Table 3.

wherein the first coating has been dried and then coated with a second coating liquid comprising:
(C) an alkaline earth metal compound, and at least one member selected from the group consisting of:
(D) a water-soluble anionic dye and
(E) an inorganic colloid, to form a second coating which second coating has also been dried.

2. The method according to claim 1, wherein said (A) water-soluble anionic dye is selected from the group consisting of C.I. Acid Blue 1, 40 and 59; C.I. Acid Black 1, 2 and 124; C.I. Direct Blue 1, 6, 71, 86 and 106; C.I. Direct Black 2, 19, 32, 38 and 77; C.I. Direct Brown

TABLE 3

| Exp. No. | First coating solution Coating solution No. | Second coating solution | | | Weight ratio (C)/(D)/(E) | pH adjuster | pH | No. of scale prevented runs |
|---|---|---|---|---|---|---|---|---|
| | | (C) Alkali earth metal compound | (D) Water-soluble anionic dye | (E) Inorganic colloid | | | | |
| 201* | None | None | None | None | — | None | — | 0 |
| 202* | 2 | None | None | None | — | None | — | 0 |
| 203* | None | Calcium hydroxide | C.I. Direct Blue 6 | Silicic acid colloid | 100/200/200 | Nitric acid | 2.5 | 0 |
| 204 | 2 | Calcium hydroxide | C.I. Direct Blue 6 | Silicic acid colloid | 100/200/200 | Nitric acid | 2.5 | 40 |
| 205 | 2 | Calcium phosphate | None | Silicic acid colloid | 100/0/200 | Nitric acid | 2.5 | 7 |
| 206 | 2 | Calcium phosphate | C.I. Acid Blue 59 | None | 100/200/0 | Nitric acid | 2.5 | 11 |
| 207 | 2 | Calcium hydroxide | C.I. Acid Black 1 | None | 100/50/0 | Nitric acid | 2.5 | 10 |
| 208 | 2 | Calcium hydroxide | C.I. Acid Black 1 | Silicic acid colloid | 100/50/200 | Nitric acid | 2.5 | 40 |
| 209 | 2 | Calcium hydroxide | C.I. Mordant Black 5 | Silicic acid colloid | 100/200/100 | Tungstic acid | 3.0 | 35 |
| 210 | 5 | Calcium hydroxide | C.I. Direct Red 31 | Lithium silicate colloid | 100/200/200 | Phospho-molybdic acid | 3.0 | 38 |
| 211 | 6 | Magnesium carbonate | C.I. Acid Black 124 | Aluminium hydroxide colloid | 100/50/500 | Molybdosilicic acid | 3.0 | 29 |
| 212 | 7 | Magnesium carbonate | C.I. Acid Blue 40 | Silicic acid colloid | 100/10/100 | p-toluene sulfonic acid | 5.0 | 26 |
| 213 | 8 | Calcium phosphate | C.I. Azoic Brown 2 | Silicic acid colloid | 100/50/100 | Tungstosilicic acid | 5.0 | 27 |
| 214 | 9 | Calcium phosphate | C.I. Acid Black 2 | Silicic acid colloid | 100/200/30 | Molybdic acid | 5.0 | 34 |
| 215 | 10 | Calcium borate | C.I. Direct Yellow 1 | Lithium silicate colloid | 100/300/500 | Phytic acid | 2.5 | 32 |
| 216 | 11 | Calcium borate | C.I. Acid Red 52 | Lithium silicate colloid | 100/50/50 | Phytic acid | 2.5 | 21 |
| 217 | 12 | Barium hydroxide | C.I. Acid Black 124 | Silicic acid colloid | 100/300/50 | Phosphoric acid | 3.0 | 28 |
| 218 | 13 | Barium hydroxide | C.I. Direct Black 2 | Silicic acid colloid | 100/100/100 | Phosphoric acid | 3.0 | 24 |
| 219 | 14 | Magnesium chloride | C.I. Acid Orange 7 | Silicic acid colloid | 100/200/300 | Phosphoric acid | 3.5 | 28 |
| 220 | 15 | Magnesium chloride | C.I. Direct Blue 6 | Silicic acid colloid | 100/500/500 | Phosphoric acid | 3.5 | 27 |
| 221 | 16 | Calcium carbonate | C.I. Direct Black 19 | Silicic acid colloid | 100/50/100 | Sulfuric acid | 3.0 | 29 |

We claim:

1. A method of preventing polymer scale deposition in a polymerization vessel during polymerization of a monomer having an ethylenic double bond and having the general formula (I):

$$CH_2=CXY \quad (I)$$

wherein X is a hydrogen atom or the methyl group; Y is a hydrogen atom, an alkyl group or a group represented by the formula: —COOH, —COOM where M is an alkali metal or an ammonium ion, —COOR, —O-COR, —OR where in the formulas R is an alkyl group, —CH, —C$_6$H$_5$, C$_6$H$_4$Z where Z is an hydrogen atom, —OH, —CH$_3$ or —CH=CH$_2$, or —CH=CH$_2$, wherein said polymerization is carried out in a polymerization vessel of which the inner wall has been previously coated with a first coating liquid comprising:
(A) a water-soluble anionic dye, and
(B) a salt of a metal selected from the group consisting of alkaline metals, zinc family metals, aluminum family metals, tin family metals, iron family metals, chromium group metals, manganese family metals, copper family metals, silver and platinum family metals, to form a first coating, 1 and 37; C.I. Reactive Blue 2, 4 and 18; C.I Mordant Black 5; C.I. Solubilized Vat Black 1; and C.I. Azoic Brown 2.

3. The method according to claim 1, wherein said component (B) is selected from the group consisting of silicates of sodium, potassium and lithium, phosphates of sodium and potassium, sodium pyrophosphate, sulfates of aluminum, titanium, molybdenum, manganese and copper, nitrates of zinc, aluminum and titanium, titanium borate, acetates of zinc, aluminum, titanium, tin, iron, nickel and copper, and chlorides of aluminum, titanium, iron, nickel and copper.

4. The method according to claim 1, wherein said component (C) alkaline earth metal compound is selected from the group consisting of magnesium carbonate, calcium carbonate, magnesium phosphate, calcium phosphate, barium phosphate, calcium sulfate, calcium borate, magnesium hydroxide, calcium hydroxide, barium hydroxide, magnesium chloride, and calcium chloride.

5. The method according to claim 1, wherein said (D) water-soluble anionic dye is selected from the group consisting of C.I. Acid Blue 1, 40 and 59; C.I. Acid Black 1, 2 and 124; C.I. Direct Blue 1, 6, 71, 86 and 106; C.I. Direct Black 2, 19, 32, 38 and 77; C.I. Direct Brown 1 and 37; C.I. Reactive Blue 2, 4 and 18; C.I Mordant Black 5; C.I. Solubilized Vat Black 1; and C.I. Azoic Brown 2.

6. The method according to claim 1, wherein said component (E) is selected from the group consisting of gold colloid, silicic acid colloid, aluminum hydroxide colloid, and lithium silicate colloid.

7. The method according to claim 1, wherein the first coating liquid contains the components (A) and (B) in a (A)/(B) weight ratio of from 100/0.1 to 100/500, and the total concentration of the components (A) and (B) is in a range of 0.005 to 10% by weight.

8. The method according to claim 1, wherein the first coating liquid has a pH of 7 or less.

9. The method according to claim 1, wherein the second coating liquid contains component (C) and at least one member out of components (D) and (E) at a (C)/[(D)+(E)] weight ratio of 100/1 to 100/5,000, and the total concentration of component (C) and component(s) (D) and/or (E) is in a range of 0.005 to 10% by weight.

10. The method according to claim 1, wherein the second coating liquid contains both of component (D) and component (E), and the (D)/(E) weight ratio is in the range of 100/1 to 100/10,000.

11. The method according to claim 1, wherein the second coating liquid has a pH of 6 or less.

12. The method according to claim 1, wherein each of the first and second coatings has a coating weight of 0.001 to 5 g/m$^2$ in the dry state.

13. The method according to claim 1, wherein said coating operations of the first and second coating liquids have been previously conducted for parts of the polymerization vessel with which the monomer comes into contact during polymerization other than its inner wall surface.

14. The method according to claim 1, wherein said coating operations of the first and second coating liquids have been further previously conducted for parts of the recovery system of an unreacted monomer with which the monomer comes into contact during polymerization.

15. The method according to claim 1, wherein the monomer is at least one member selected from the group consisting of vinyl esters; acrylic acid, methacrylic acid, and esters and salts thereof; diene monomers; styrene, α-methylstyrene, acrylonitrile; and vinyl ethers.

16. The method according to claim 1, wherein said polymerization is carried out as suspension polymerization, emulsion polymerization, solution polymerization or bulk polymerization.

17. A polymerization vessel having a double coating on the inner wall, prepared by coating on the inner wall a first coating liquid comprising:
 (A) a water-soluble anionic dye, and
 (B) a salt of a metal selected from the group consisting of alkaline metals, zinc family metals, aluminum family metals, tin family metals, iron family metals, chromium group metals, manganese family metals, copper family metals, silver and platinum family metals,
to form a first coating, drying the first coating, and then coating on the dry first coating a second coating liquid comprising:
 (C) an alkaline earth metal compound, and at least one member selected from the group consisting of:
 (D) a water-soluble anionic dye and
 (E) an inorganic colloid,
to form a second coating, followed by drying said second coating.

18. The method according to claim 1, wherein (B) is a salt of a metal selected from the group consisting of lithium, sodium, potassium, zinc, aluminum, titanium, tin, iron, nickel, chromium, molybdenum, manganese, copper, silver and platinum.

19. A polymerization vessel as claimed in claim 17, wherein component (B) is a salt of a metal selected from the group consisting of lithium, sodium, potassium, zinc, aluminum, titanium, tin, iron, nickel, chromium, molybdenum, manganese, copper, silver and platinum.

20. A method according to claim 1, wherein said first and second coatings are dried at a temperature of from room temperature to 100° C.

21. A polymerization vessel according to claim 17, wherein said first and second coatings are dried at a temperature of from room temperature to 100° C.

22. A method of preventing polymer scale deposition in a polymerization vessel as claimed in claim 1, wherein said first coating liquid consists essentially of components (A) and (B) and a solvent and said second coating liquid consists essentially of components (C), (D), and (E) and a solvent.

23. A polymerization vessel having a double coating on the inner wall as claimed in claim 17, wherein said first coating liquid consists essentially of components (A) and (B) and a solvent and said second coating liquid consists essentially of components (C), (D), and (E) and a solvent.

* * * * *